United States Patent
Zhang

(10) Patent No.: US 12,361,739 B2
(45) Date of Patent: Jul. 15, 2025

(54) METHOD AND APPARATUS TO LOCATE FIELD LABELS ON FORMS

(71) Applicant: KONICA MINOLTA BUSINESS SOLUTIONS U.S.A., INC., Foster City, CA (US)

(72) Inventor: Yongmian Zhang, San Mateo, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 482 days.

(21) Appl. No.: 17/856,764

(22) Filed: Jul. 1, 2022

(65) Prior Publication Data
US 2024/0005687 A1    Jan. 4, 2024

(51) Int. Cl.
*G06V 30/412* (2022.01)
*G06F 40/189* (2020.01)
*G06V 30/18* (2022.01)

(52) U.S. Cl.
CPC .......... *G06V 30/412* (2022.01); *G06F 40/189* (2020.01); *G06V 30/18086* (2022.01)

(58) Field of Classification Search
CPC .............. G06V 30/412; G06V 30/413; G06V 30/18086; G06F 40/189; G06F 40/174
See application file for complete search history.

(56) References Cited

U.S. PATENT DOCUMENTS

| | | | |
|---|---|---|---|
| 10,402,640 B1* | 9/2019 | Becker | G06V 30/412 |
| 11,829,701 B1* | 11/2023 | Chaubal | G06V 30/10 |
| 2016/0188541 A1* | 6/2016 | Chulinin | G06F 40/295 704/8 |
| 2020/0334456 A1* | 10/2020 | Sridharan | G06F 18/2411 |
| 2021/0390251 A1* | 12/2021 | Swvigaradoss | G06F 40/174 |
| 2023/0394865 A1* | 12/2023 | Reid | G06V 30/416 |

* cited by examiner

*Primary Examiner* — Shefali D Goradia
(74) *Attorney, Agent, or Firm* — SQUIRE PATTON BOGGS (US) LLP

(57) ABSTRACT

Method and apparatus to identify field labels from filled forms using image processing to compare two or a few copies of the same kind of form, possibly filled out differently. Filled forms are processed to provide text strings, one for each line of text on each filled form. The text strings are converted to vectors. Vectors from different filled forms are compared to identify common words which are indicative of field labels. In an embodiment, a histogram may be generated to show frequency of occurrence of characters and words, the histogram values also being indicative of field labels.

20 Claims, 8 Drawing Sheets

*Dr. Everett Doolittle*     255

| NAME: | Jonas Jackson | DOB: | 02/03/1994 |
205        210

| ADDRESS: | 1234 Arbuckle Lane<br>Madison, UT 56478 | PHONE: | 123-456-7890 |
215        220

| DIAGNOSIS: | Acute inflammation of the solar plexus
225

| PROCEDURE/TREATMENT: | Chiropractic care and acupuncture
230

| BEGIN DATE: | 02/ 03/ 2023     | END DATE: | 04/ 03/ 2023
235        240

| REASON FOR PROCEDURE/TREATMENT: | Patient allergic to medications
245

| PROCEDURE/TREATMENT INSTRUCTIONS: | Manipulate spine for 10-15 minutes<br>Apply needles to anterior areas and supply<br>current for 30-45 seconds
250

FIG. 2A

| NAME: | William Aloysius Smith | DOB: | 03/04/86 |

205'    210'

| ADDRESS: | 8888 Fifth Avenue Apt. 2022 Seattle, WA 98101 | PHONE: | 222-333-4444 ext. 5555 |

215'    220'

| DIAGNOSIS: | Second degree sprain of the left ankle
First degree tear of meniscus in left knee

225'

| PROCEDURE/TREATMENT: | Walking boot; arthroscopic surgery

230'

| BEGIN DATE: | 07/ 08/ 23    | END DATE: | 11/ 08/ 23

235'    240'

| REASON FOR PROCEDURE/TREATMENT: | Sprain requires time to heal
Menicus requires repair

245'

| PROCEDURE/TREATMENT INSTRUCTIONS: | Self-explanatory

BEGIN DATE: 02/03/2023   END DATE: 04/03/2023   310

BEGIN DATE: 07/08/23   END DATE: 11/08/23   320

FIG. 3

NAME: 605

DOB: 610

ADDRESS: 615

PHONE: 620

DIAGNOSIS: 625

PROCEDURE/TREATMENT: 630

BEGIN DATE: 635

END DATE: 640

REASON FOR PROCEDURE/TREATMENT: 645

PROCEDURE/TREATMENT INSTRUCTIONS: 650

FIG. 6

METHOD AND APPARATUS TO LOCATE FIELD LABELS ON FORMS

FIELD OF THE INVENTION

Aspects of the present invention relate to image processing of forms, and more particularly to image processing of filled forms to identify fields in the forms.

BACKGROUND OF THE INVENTION

Automatically finding field labels in images of forms is useful in document process automation. In order to understand how contents of a form match fields of the form, it is necessary to know the form's field labels. Often field labels can be identified in a blank form. However, a blank form is not always available. In that event, it is necessary to identify field labels from the image of a filled form.

There are challenges inherent in reading and comparing filled forms. For example, the same form can be filled out differently, with different contents in each field. As another example, filled form images can be magnified or shrunk to different extents, resulting in different filled forms having different vertical and horizontal dimensions.

Because of the foregoing differences, two of the same type of filled form images may differ significantly from each other, not only in appearance but also in scale, rotation, font style, and/or font size. As a result, it can be difficult to directly apply image processing techniques such as image feature descriptors and image transformations to find fields in filled forms.

In addition, attempting to apply artificial intelligence (AI) techniques to the above-described problems can be time consuming and difficult to accomplish, whether using supervised learning or unsupervised learning.

SUMMARY OF THE INVENTION

In view of the foregoing, it is one object of the present invention to identify field labels by comparing images of the same type of filled form. Among other things, embodiments of the present invention provide the following:

A string encoding technique which is highly robust under the variations of scale and rotation, font size and font style, to solve the alignment of images of text lines between two different images of a filled form;

A field label-identifying histogram hierarchical technique that tolerates errors in optical character recognition (OCR) error tolerant, but can discriminate between field labels and filled contents;

A decreased need for a large number of images of a filled form in order to identify field labels.

Aspects of the invention enable identification of field labels in filled forms, and the generation of an unfilled form after the identification, in a relatively small number of iterations, without requiring the use of AI techniques or the compilation of substantial data sets to train an AI system.

BRIEF DESCRIPTION OF THE DRAWINGS

The foregoing and other features and aspects of the present invention now will be described in detail with reference to the accompanying drawings, in which:

FIGS. 2A and 2B are samples of forms with field labels;

FIG. 3 shows one of the lines of text in the forms of FIGS. 2A and 2B;

FIG. 6 is a sample form that can be produced according to an embodiment.

DETAILED DESCRIPTION

Figure 1:
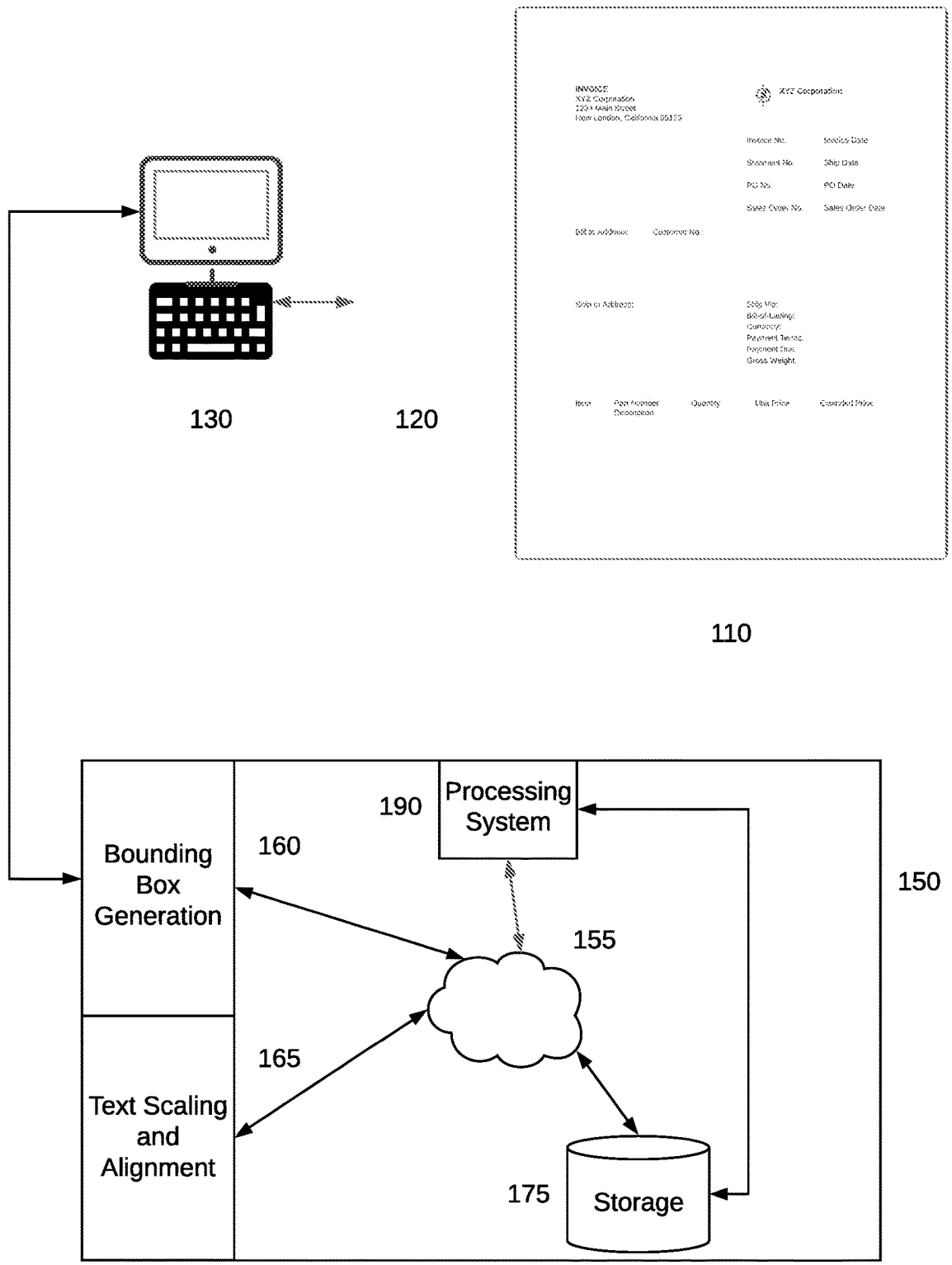
FIG. 1 is a high-level block diagram showing an exemplary embodiment of structure to implement aspects of the present invention.

FIG. 1 is a high-level block diagram of a system to implement aspects of the method described herein according to one or more embodiments. In FIG. 1, computing apparatus may provide pairs of synthetically generated forms (blank, partly filled, or filled) to computing system 150. In an embodiment, a filled form 110 may be provided via scanner 120, which may be connected to computing system 150 either directly or through computing apparatus 130. In an embodiment, a camera may provide the input image.

In an embodiment, computing system 150 will process filled forms to identify field labels. Computing system 150 may include one or more processors, one or more storage devices, and one or more solid-state memory systems (which are different from the storage devices, and which may include both non-transitory and transitory memory).

As part of the discernment of field label and value location, computing system 150 may generate bounding boxes around text, using bounding box generation system 160. In an embodiment, computing system 150 may include a text scaling and alignment system 165 to compensate for images of different scale in different filled forms. In an embodiment, storage 175 may store the input images that computing system 150 processes.

Computing system 150 may be in a single location, with network 155 enabling communication among the various elements in computing system 150. Additionally or alternatively, one or more portions of computing system 150 may be remote from other portions, in which case network 155 may signify a cloud system for communication. In an embodiment, even where the various elements are co-located, network 155 may be a cloud-based system.

Additionally or alternatively, processing system 190, which may contain one or more of the processors, storage systems, and memory systems referenced above, may implement one or more algorithms to resolve locations for field labels.

In order to have line-level detection, the images of lines are first extracted using line segmentation algorithms. Ordinarily skilled artisans will be aware of available line segmentation algorithms, and so for the sake of compactness of description line segmentation algorithm details are omitted here.

FIGS. 2A and 2B show two examples of the same form, each filled out differently, and each having a different degree of magnification. In these figures, bounding boxes are drawn around text in field labels in a form. Field 205, 205' is the Name field, filled in with the name "Jonas Jackson". Field 210, 210' is the date of birth (DOB) field, filled in with two digits each for the month and day, and, for the year, either four digits (FIG. 2A) or two digits (FIG. 2B). Field 215, 215' is the address field, filled in with a two-line address. Field 220, 220' is the phone number field, filled in with a ten-digit number.

Field 225, 225' is the diagnosis field, filled in with a description of the diagnosis. Field 230, 230' is the procedure/treatment field, filled in with an identification of procedures and/or treatments to be followed. Field 235, 235' is a begin date field, filled in with a date on which the procedure and/or treatment is to begin. Field 240, 240' is an end date field, filled in with a date on which the procedure and/or treatment is to end. Similarly to fields 210, 210', in FIG. 2A the begin date field 235, 235' and end date field 240, 240' are filled in with two digits each for the month and day, and for the year, either four digits (FIG. 2A) or two digits (FIG. 2B). Field 245, 245' is a field that is filled in with the reason for the particular procedure and/or treatment in field 230, 230'. Field 250, 250' is a field that is filled in with instructions for carrying out the procedure and/or treatment.

FIG. 2A also contains an extraneous handwritten notation 255 which FIG. 2B does not have.

One aspect of filled forms such as FIGS. 2A and 2B is that their fields are filled in differently, depending on what is to be put in those fields. Descriptions of different diagnoses, procedures/treatments, and/or procedures/treatment instructions can take different amounts of space. Consequences of these differently filled-in forms will be discussed below.

FIG. 3 shows an example of images of the first line in each of the documents in FIGS. 2A and 2B. The first line 310 contains fields 205, 210 (FIG. 2A) and the second line 320 contains fields 205', 210' (FIG. 2B).

In an embodiment, after the line images in FIG. 3 are extracted from the filled forms in FIGS. 2A and 2B, each line image is digitized into a text string. The text string then is segmented into a set of words with an order based on a position of a word in the string. Repeating words in the text string may be identified by putting an extra character, or extra characters after the word. For example, if a word in the text string appears twice, the second occurrence may have a _1 appended to it. If the word appears three times, the second occurrence may have a _1 appended to it and the third occurrence may have a _2 appended to it. In an embodiment, punctuation marks may not be counted as characters in the text string.

For example, after the line image 310 in FIG. 3 is digitized, the text string can be segmented as follows: "BEGIN\DATE\02\03\2023\END\DATE_1\04\03\2023". After the line image 320 in FIG. 3 is digitized, the resulting text string can be segmented as follows: "BEGIN\DATE\07\08\23\END\DATE_1\11\08\23".

In view of the foregoing, in an embodiment it is possible to encode a set of words in a text string as follows:

1) The words in the text string may be numbered with successively increasing numbers from left to right, to form a numerical vector representation of the text string. For example, the text string from the line image 310 may be encoded as a vector $S_1=\{1, 2, 3, 4, 5, 6, 2, 7, 8, 9\}$. That is, the word "DATE" appears twice in the vector, and so is assigned the same number 2) A vector $S_2$ may be encoded for the text string 320 in FIG. 3 in the same way as vector $S_1$. Vector $S_2$ may be generated as follows. If a word in vector $S_2$ is the same as a word in $S_1$, the position of the word is the same as the position of the corresponding word in vector $S_1$, and will be assigned the same number. In the present situation, then, vector $S_2=\{1, 2, 10, 11, 12, 2, 7, 13, 14, 15\}$. That is, the first, second, sixth, and seventh words in text string 320 are the same as in text string 310, and so they are assigned the same numbers as in the vector for text string 310. The third through fifth words and eighth through tenth words in text string 320 are different from those in text string 310.

In an embodiment, if there are words in vector $S_2$ that are not in vector $S_1$, those words may be encoded to follow the number of the last position in vector $S_1$. In an embodiment, if the second text string is shorter than the first text string, padding zeros may be added to vector $S_2$ to make vector $S_2$ the same length as vector $S_1$. Vector $S_2$ may be encoded in this way so that a length of a longest increasing subsequence of vector $S_2$ may be a measure of similarity between vector $S_1$ and vector $S_2$, where the longest increasing subsequence is a subsequence of a given sequence in which the subsequence's elements are in sorted order, lowest to highest, and in which the subsequence is as long as possible.

With the foregoing comparison of two vectors for the same line of text in two different filled forms, it is useful to consider the performance of this comparison for all lines of text in the two different filled forms. For purposes of this comparison, it is appropriate to select, by hand, two copies of the same form, filled out differently. In this way, the text in the two copies may be compared, and the field labels identified.

Looking back at FIGS. 2A and 2B, it can be seen that some of the fields contain more lines than others. For example, field 215 in FIG. 2A has two lines, while field 215' in FIG. 2B has three lines. Field 225 in FIG. 2A has one line, while field 225' in FIG. 2B has two lines. Field 250 in FIG. 2A has three lines, while field 250' in FIG. 2B has one line. The differing number of lines in the two forms represented in FIGS. 2A and 2B, respectively, motivate the approach that will be described for comparing line images of the two forms.

Looking now at the two different copies of the same form, after digitizing and word segmentation, there may be M text strings (corresponding to M line images) from the first image and N text strings (corresponding to N line images) from the second image. M and N may be different for a variety of reasons. For example, there may be additional text lines in one or the other of the images, as FIGS. 2A and 2B show. Sometimes there may be artifacts, as seen at the top of FIG. 2A, which has a handwritten notation 255, as noted previously. As a result, the following two word matrices A and B, with M rows and N rows, respectively, can be provided to represent the above two document images:

$$A_K = \begin{bmatrix} a_{11} & \cdots & a_{1K} \\ \vdots & \ddots & \vdots \\ a_{m1} & \cdots & a_{mK} \end{bmatrix}, B_K = \begin{bmatrix} b_{11} & \cdots & b_{1K} \\ \vdots & \ddots & \vdots \\ b_{m1} & \cdots & b_{mK} \end{bmatrix}$$

where $a_{i1} \ldots a_{iK}$, a set of words for the first image, is a row in matrix A and $b_{i1} \ldots b_{iK}$, a set of words for the second image, is a row in matrix B, respectively. To determine correspondence between a row in matrix A and a row in matrix B, in an embodiment, the following sequence may be performed:

1) Take a row, $a_{i1} \ldots a_{iK}$, from matrix A;
2) Find any repeated words in $a_{i1} \ldots a_{ik}$ and append a repeated word with "_n" at the end;
3) Encode $a_{i1} \ldots a_{iK}$ as a vector as described above;
4) Take a set of rows, $b_{j1} \ldots b_{jK}$ from matrix B, where, in an embodiment, j=i−3 to i+3. Depending on the embodiment, a larger or smaller number of rows either before or after the row of focus may be selected. A reason for looking at at least three lines (that is, at least one line before and one line after the line of focus) is to account for possible situations in which the filled-in text associated with a particular field label may occupy different numbers of lines in the respective filled form, as in the examples discussed above with respect to FIGS. 2A and 2B;

5) Encode each row of $b_{j1} \ldots b_{jk}$ with respect to $a_{i1} \ldots a_{iK}$ as described above;

6) Find the best match between $a_{i1} \ldots a_{iK}$ and $b_{j1} \ldots b_{jK}$ by finding the longest increasing subsequence for each row of $b_{j1} \ldots b_{jk}$, where j=i−3 to i+3;

7) Go to the next row by incrementing i=i+1.

After the ith iteration of the just-described process, resulting in associating two text lines, l1 and l2, respectively, from the two images, the next step is to align l1 and l2 before going on to the next row. Alignment of l1 and l2 may be necessary because of considerations such as differing image scale or font size between the two text lines. To determine the correct alignment, in an embodiment each word in l1 and l2 may be segmented into characters or words. Because the text lines have been matched based on a vector match, it is likely that there will be characters or words in common between the two text lines, so that scaling can be carried out. If no common characters or words are found, the lack of common characters implies that there are no common keywords existing in these two lines. In this case, the process may go on to handle other pairs of text lines, as described previously.

In an embodiment, after a certain number of failures of the process in terms of ability to align text lines, it may be presumed that alignment has failed. Such failure may occur because of image quality of one or both of the filled forms being compared, or because of artifacts on one or both of the filled forms, or for other technical reasons which ordinarily skilled artisans will appreciate. In that event, another filled form may be substituted for one of the just-compared filled forms, or another pair of filled forms may be selected, and the process repeated.

If there are common characters or words between the two text lines l1 and l2, it will be possible to identify a group of characters or words that are common to both l1 and l2, as seeds for calculating the scale $S_x$ and $S_y$ for the two text lines. For example, looking toward the bottom of FIG. 5, bounding boxes may be drawn around each of the words in the respective text lines.

Figure 5:
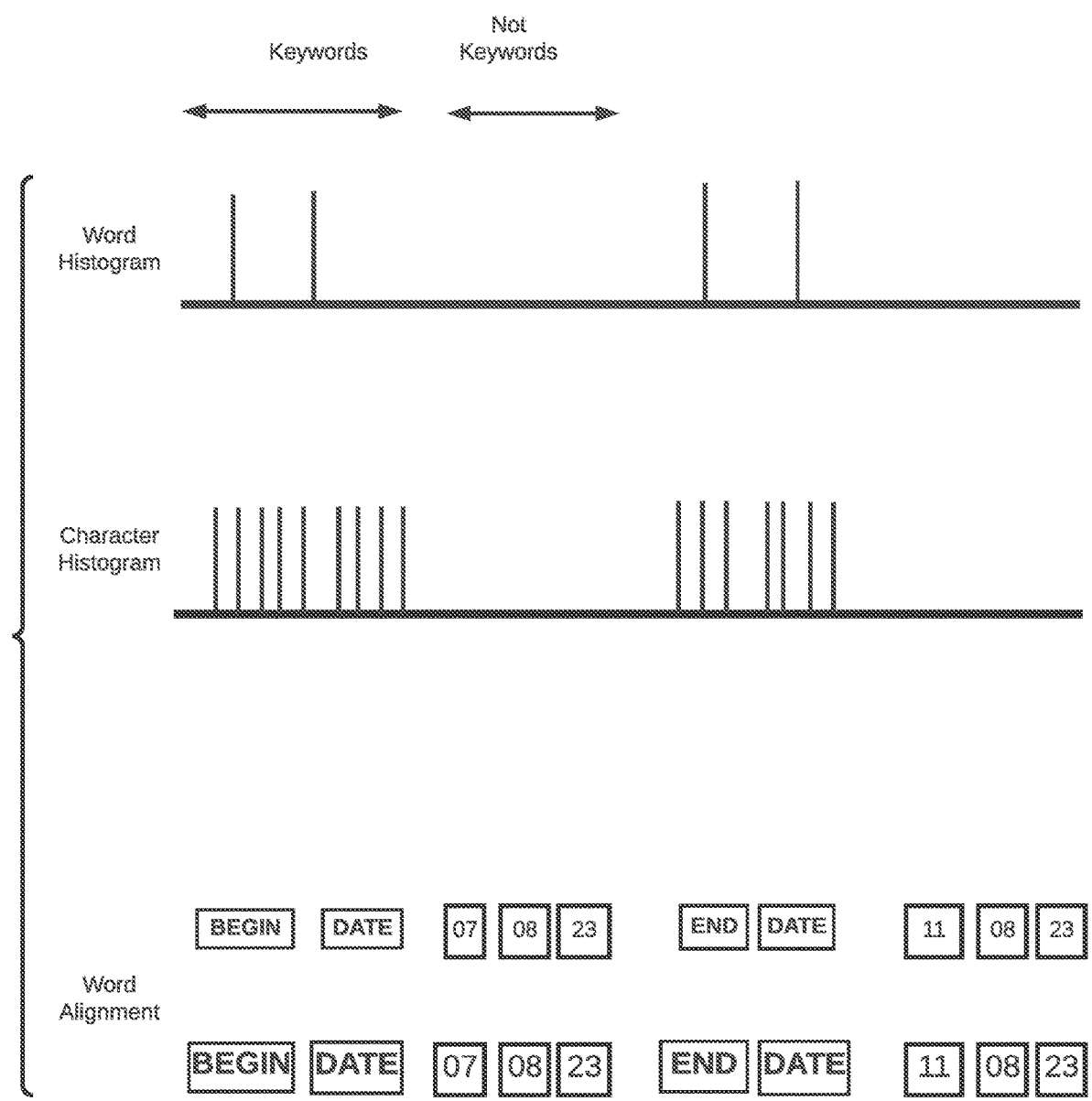
FIG. 5 shows histograms of occurrence of characters of words in the lines of text in FIG. 3.

Using the above calculated scales $S_x$ and $S_y$, all of the bounding boxes of words in l1 can be made to the same scale as in l2. Then, each word in l2 can be aligned to the corresponding word in l1 based on a position of its bounding box as FIG. 5 shows. In an embodiment, further alignment can be conducted on the characters of each corresponding word between l1 and l2 by minimizing an edit distance via a deletion and insertion operation. After alignment, a character histogram can be constructed, as shown in the middle of FIG. 5. In the character histogram, the x-axis represents the characters of the words in text lines, and the y-axis represents the number count of that character appearing in the word. More frequently occurring characters will be represented by taller lines.

Still further, a word histogram can be constructed on top of the character histogram, where the x-axis represents the words in text lines and the y-axis represents the density of the underlying distribution of the characters in the word, where the range of the density is [0, 1], using the following equation:

$$\rho = \frac{\sum_{i=1}^{n} f_i}{mn}$$

where ρ is the density of the underlying distribution of the characters in a word; m is a number of text lines; n is a number of characters in the word; and $f_i$ is the number count for the ith character in the word. The character histogram and the word histogram form a histogram hierarchy which can be used to identify field labels given several form images. A group of adjacent words with higher density values are determined to be the field labels to be extracted. With this extraction, a blank form such as the one shown in FIG. 6 may be produced, where the field labels 605-650 correspond to field labels 205-250 in FIG. 2A.

The foregoing description has been based on the assumption that the two filled forms that are received at the beginning of the process can be matched, aligned, and scaled, and character and word histograms produced to determine field labels from just those two forms. Sometimes, an additional filled form will need to be added to the comparison. In that event, looking at three images with constructed word matrices A, B and C being built, and identified row correspondence between matrices A and B and between matrices A and C, the following process may be provided.

1. Take a row of words from matrix A and from the corresponding row in matrices B and C;
2. Align the row of words from matrices B and C to the row of words from matrix A;
3. Build histograms by using the three aligned rows;
4. Localize keywords based on hierarchy histogram for this row;
5. Repeat 1 to 4 until all rows are processed.

Figure 4A:
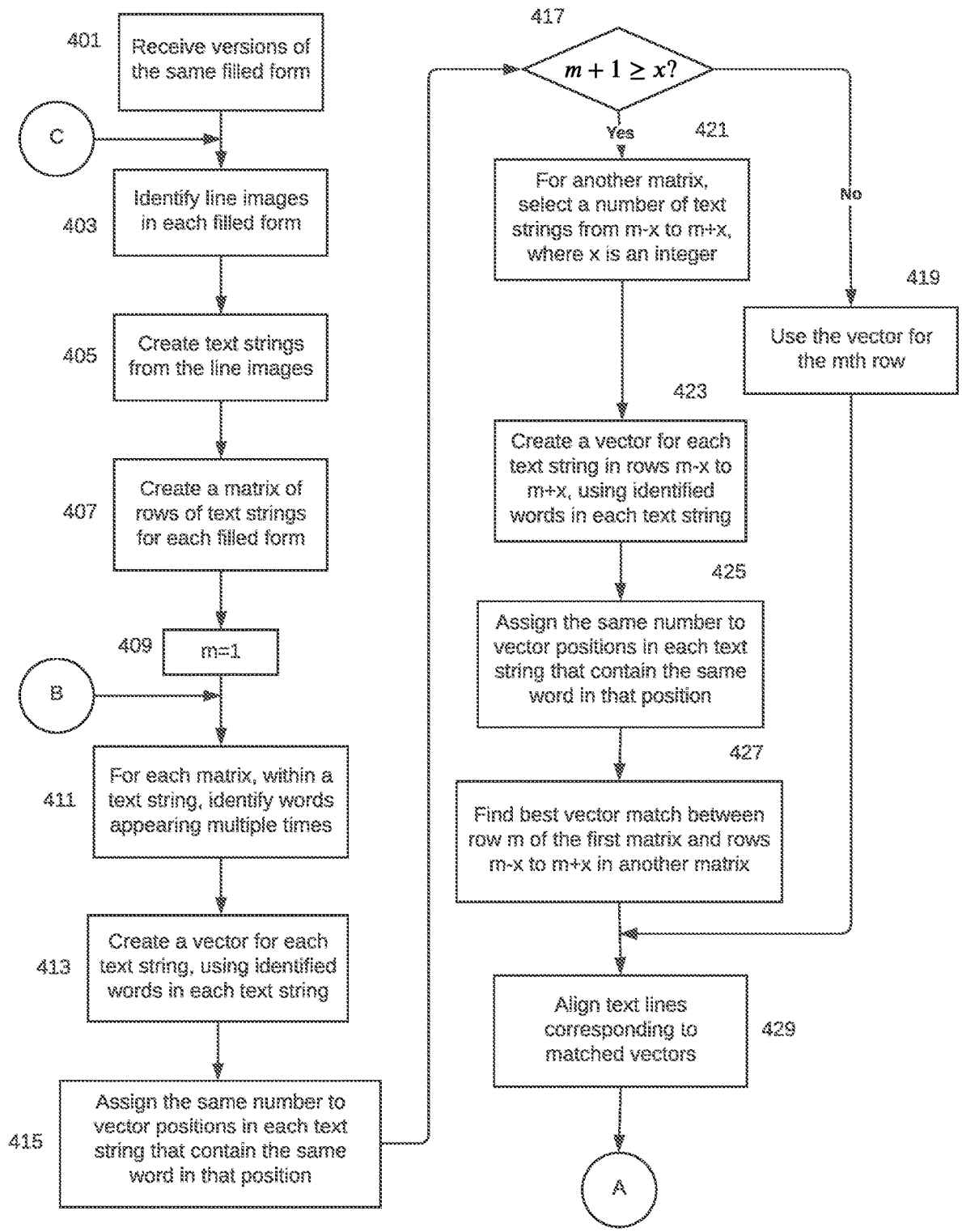
FIGS. 4A and 4B are a flow chart showing an exemplary sequence of operation according to an embodiment.
Figure 4B:
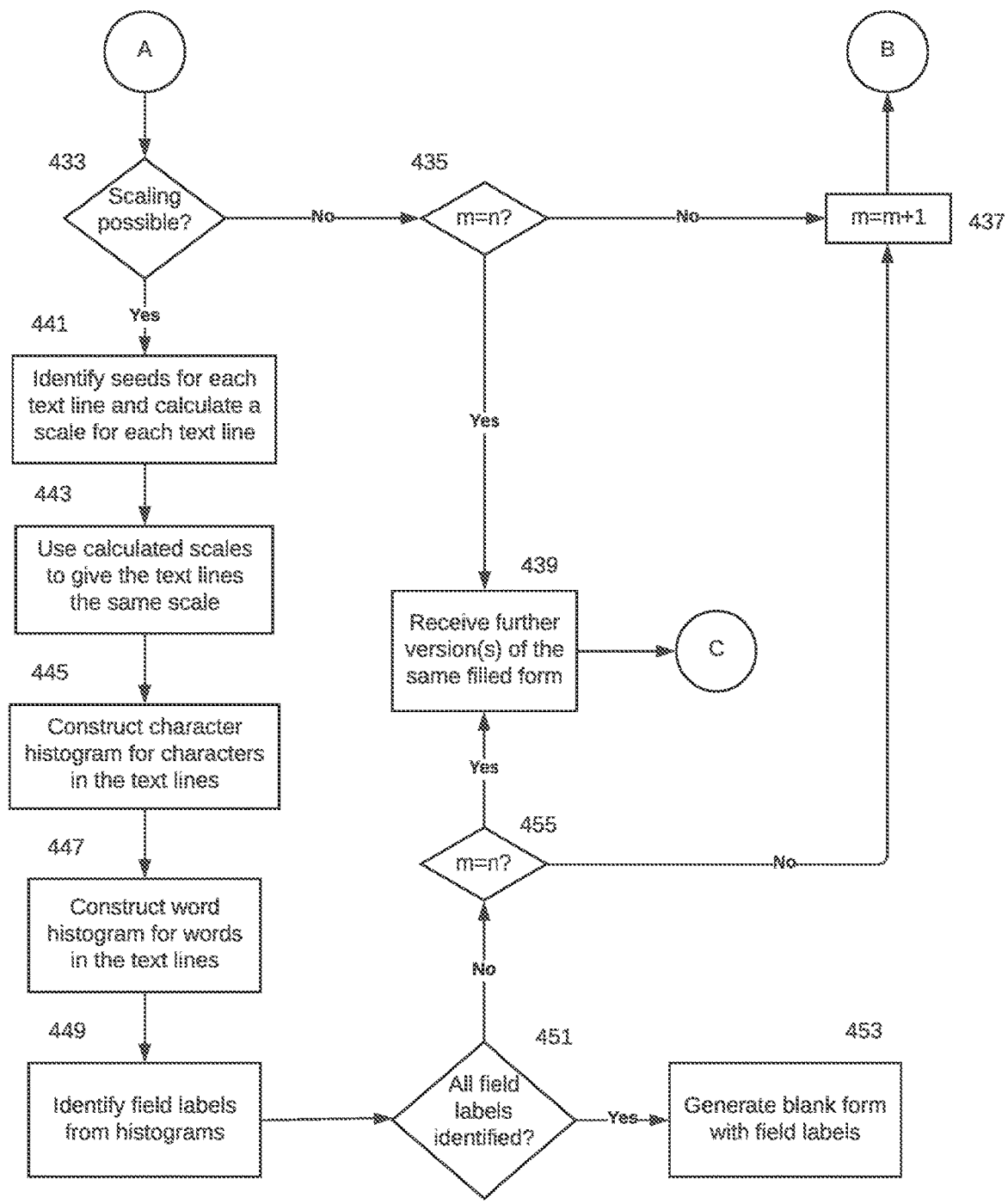

FIGS. 4A and 4B describe a flow for the foregoing process according to an embodiment. At 401, a number of versions of the same filled form are received. In specifically described embodiments, two or three versions may be received at this point, but in any event the number is not large. At 403, image processing is performed to identify line images in each of the filled forms. At 405, text strings are created from the line images. At 407, for each filled form, a matrix of text strings is created. At 409, the first iteration of the comparison of lines of the respective matrices begin, with a variable m being set to 1.

At 411, for a first matrix, within a text string, words appearing multiple times are identified. At 413, a vector is created for each text string, using the identified words. At 415, where the same words are identified in the text string, the same number at that position in the vector is assigned.

At 417, a determination is made to see whether the process is far enough along to be working on a line image that is far enough down the matrix to be able to look a predetermined number of rows (x, an integer) before and after the row being worked on. If not ('no" at 417), then at 419, the vector for the mth row is used, and flow proceeds to 429, which will be described. If the process is far enough along ("yes" at 417), then at 421, for another matrix, a number of text strings from m−x to m+x is selected, and at 423, a vector is created for each of those text strings, using identified words in each text string. As before, at 425 the same number is assigned to vector positions in each text string that contain the same word for that position.

At 427, then, a best vector match between row m of the first matrix and rows m−x to m+x of another matrix may be found. (Similarly to the description for matrices A, B, and C, 427 may be a comparison between two matrices, or among three, or in any event, among a very small number compared to a number required to obtain a training set to train an AI-based system.) At 429, text lines are aligned corresponding to the matched vectors.

Having matched the vectors, at 433 a determination is made as to whether scaling is possible to give the text lines the same scale. If not ("no" at 433), then at 435 a check is made to see whether all of the lines of the first matrix have been processed. If not ("no" at 435), then at 437, m is incremented, and flow returns to 411. If all of the lines of the first matrix have been processed ("yes" at 435), then at 439, a further version or versions of the same filled form are received, and flow returns to 403.

If scaling is possible ("yes" at 433), then at 441, seeds are identified from among characters and/or words for each text line, and a scale is calculated. At 443, the calculated scales are used to give the text lines under comparison the same scale. Here, again, the number of text lines under comparison may be two or three, depending on the number of matrices being compared in the embodiment, or possibly a few more, but in any event, a much smaller number compared to a number required to obtain a training set to train an AI-based system.

At 445, after scaling has been accomplished, a character histogram may be constructed for characters in the text lines. Then, at 447, a word histogram may be constructed for words in the text lines. After this, at 449, field labels may be identified from the histograms, with the higher numbers as represented along the y axis of the histograms signifying characters in words in the field labels (445), and words in the field labels (447).

At 451, if all field labels for the form have been identified, ("yes" at 451), then at 453 a blank form with the field labels may be generated. If not all of the field labels have been generated ("no" at 451), then at 455 a check is made to see whether all of the lines of the first matrix have been processed. If not ("no" at 455), then at 437, m is incremented, and flow returns to 411. If all of the lines of the first matrix have been processed ("yes" at 455), then at 439, a further version or versions of the same filled form are received, and flow returns to 403.

While aspects of the present invention have been described in detail with reference to various drawings, ordinarily skilled artisans will appreciate that there may be numerous variations within the scope and spirit of the invention. Accordingly, the invention is limited only by the following claims.

What is claimed is:

1. A computer-implemented method comprising:
   a. responsive to receiving versions of a filled form as images, processing the images to generate a text string for each line of each version;
   b. for each version, generating a matrix of rows of text strings;
   for each row for each version:
   c. generating a best match for the row of one version with a vector within a predetermined number of rows of the vector for the row of another version;
   d. constructing a character histogram for characters in the text string in that row;
   e. constructing a word histogram for words in the text string in that row;
   the method further comprising:
   f. responsive to generating the best match, identifying field labels for the filled forms from the character histograms and the word histograms; and
   g. generating a blank form with the identified field labels.

2. The computer-implemented method of claim 1, wherein a number of said versions in a. is two or three.

3. The computer-implemented method of claim 1, wherein the predetermined number of rows is three.

4. The computer-implemented method of claim 1, wherein the processing comprises identifying line images in each filled form, and generating a text string from each of the identified line images.

5. The computer-implemented method of claim 1, further comprising, responsive to generating the best match, aligning respective text lines corresponding to the vectors in the best match.

6. The computer-implemented method of claim 5, wherein the aligning comprises scaling text in the respective text lines so that the text in the respective text lines is a same size.

7. The computer-implemented method of claim 6, wherein the scaling comprises identifying characters in the respective text lines that are the same, and performing the scaling on the identified characters.

8. The computer-implemented method of claim 1, wherein generating the best match comprises:
   c.1. creating a vector for the text string in that row, using identified words in the text string, and assigning a number in the vector for each identified word in the text string;
   c.2. comparing a vector for the row of one version with vectors within a predetermined number of rows of the vector for the row of another version;
   c.3. responsive to the comparing, generating the best match.

9. The computer-implemented method of claim 8, further comprising, for each row in each version, identifying words appearing multiple times in each of the text strings, and, for each of the words appearing multiple times, assigning the same number to each position in the vector where the word appears.

10. The computer-implemented method of claim 1, wherein an x-axis of the word histogram represents the words in text lines and an y-axis of the word histogram represents a density of an underlying distribution of characters in the word, where a range of the density is [0, 1], using the following equation:

$$\rho = \frac{\sum_{k=1}^{n} f_i}{mn}$$

where $\rho$ is the density of the underlying distribution of the characters in a word; m is a number of text lines; n is a number of characters in the word; and $f_i$ is a number count for the ith character in the word.

11. A system comprising:
   a processor; and
   a non-transitory memory storing instructions which, when performed by the processor, perform a method comprising:
   a. responsive to receiving versions of a filled form as images, processing the images to generate a text string for each line of each version;
   b. for each version, generating a matrix of rows of text strings;
   for each row for each version:
   c. generating a best match for the row of one version with a vector within a predetermined number of rows of the vector for the row of another version;
   d. constructing a character histogram for characters in the text string in that row;
   e. constructing a word histogram for words in the text string in that row;

the method further comprising:
- f. responsive to generating the best match, identifying field labels for the filled forms from the character histograms and the word histograms; and
- g. generating a blank form with the identified field labels.

12. The system of claim 11, wherein a number of said versions in a. is two or three.

13. The system of claim 11, wherein the predetermined number of rows is three.

14. The system of claim 11, wherein the processing comprises identifying line images in each filled form, and generating a text string from each of the identified line images.

15. The system of claim 11, wherein the method further comprises, responsive to generating the best match, aligning respective text lines corresponding to the vectors in the best match.

16. The system of claim 15, wherein the aligning comprises scaling text in the respective text lines so that the text in the respective text lines is a same size.

17. The system of claim 16, wherein the scaling comprises identifying characters in the respective text lines that are the same, and performing the scaling on the identified characters.

18. The system of claim 11, wherein generating the best match comprises:
- c.1. creating a vector for the text string in that row, using identified words in the text string, and assigning a number in the vector for each identified word in the text string;
- c.2. comparing a vector for the row of one version with vectors within a predetermined number of rows of the vector for the row of another version;
- c.3. responsive to the comparing, generating the best match.

19. The system of claim 11, wherein the method further comprises, for each row in each version, identifying words appearing multiple times in each of the text strings, and, for each of the words appearing multiple times, assigning the same number to each position in the vector where the word appears.

20. The system of claim 11, wherein an x-axis of the word histogram represents the words in text lines and an y-axis of the word histogram represents a density of an underlying distribution of characters in the word, where a range of the density is [0, 1], using the following equation:

$$\rho = \frac{\sum_{i=1}^{m} f_i}{mn}$$

where $\rho$ is the density of the underlying distribution of the characters in a word; m is a number of text lines; n is a number of characters in the word; and $f_i$ is a number count for the ith character in the word.

* * * * *